United States Patent [19]
Van Gils

[11] 3,878,035
[45] Apr. 15, 1975

[54] METHOD OF PREPARING POLYAMIDE REINFORCED POLYESTER RESINS

[75] Inventor: Gerard E. Van Gils, Tallmadge, Ohio

[73] Assignee: The General Tire & Rubber Company, Akron, Ohio

[22] Filed: July 23, 1973

[21] Appl. No.: 381,907

[52] U.S. Cl. .............. 260/835; 264/135; 264/137; 264/257; 264/258; 427/416
[51] Int. Cl... B32b 27/08; B32b 27/36; B32b 27/38
[58] Field of Search .......... 264/136, 134, 137, 135, 264/257, 258, 279, DIG. 56, 57; 117/138.8 N, 138.8 S, 161 Z, 161 B, 161 R, 76 T, 72; 161/184, 188, 227, 233, 175; 156/314, 315

[56] References Cited
UNITED STATES PATENTS

| | | | |
|---|---|---|---|
| 2,928,456 | 3/1960 | Potchen et al. | 161/184 |
| 3,063,966 | 11/1962 | Kwolek et al. | 260/78 R |
| 3,094,511 | 6/1963 | Hill et al. | 260/78 R |
| 3,502,603 | 3/1970 | Gallagher et al. | 117/76 T |
| 3,508,951 | 4/1970 | Shimp et al. | 161/184 |
| 3,803,035 | 4/1974 | Bhakuni et al. | 57/153 |

OTHER PUBLICATIONS

Skeis, Handbook of Adhesives, Reinhold, N.Y. (1964), pp. 486 & 487 relied on.

*Primary Examiner*—Robert F. White
*Assistant Examiner*—W. E. Hoag

[57] ABSTRACT

Composite articles composed of polyesters resins bonded to nylon or polyamide elements, particularly polyamides in which a high proportion of the amide linkages are attached directly to aromatic rings, are prepared by wetting the elements with a liquid dispersion or solution of an epoxide having an average of from about two to four epoxide groups per molecule and a molecular weight up to about 600, heat curing the wetted elements, incorporating the resulting elements in an uncured unsaturated liquid polyester resin shaping the desired article and curing the resin. Improved physical and mechanical properties are obtained with this process. It is particularly useful for the bonding to polyester resins of crystalline polyamides having a large number of aromatic groups in the polymeric structure, e.g., "Fiber B".

8 Claims, No Drawings

METHOD OF PREPARING POLYAMIDE REINFORCED POLYESTER RESINS

SUMMARY OF THE INVENTION

According to the present invention it has been discovered that polyamide reinforcing elements can more readily be bonded or adhered to polyester resins by wetting the elements with a liquid dispersion or solution of a minor amount of an epoxide having an average of from about two to four epoxide groups per molecule and having a molecular weight up to about 600, heat curing said wetted elements, introducing said dried polyepoxide treated elements in the desired polyester resin, shaping the resulting composite as desired and curing it.

The principal object of this invention is to provide composite articles containing polyamide reinforcing elements having a minor amount of a primer adhesive so that the adhesive containing elements can subsequently be bonded to polyester resins on curing, the resulting composites being characterized by exhibiting improved physical and mechanical properties such as flexural strength and mechanical strength.

DESCRIPTION OF THE PREFERRED EMBODIMENTS

The polyamide, or nylon, reinforcing element of the present invention can be in the form of monofilament, fibers, yarn, tow, twisted yarn, cord or fabric. The polyamide can be an aromatic polyamide, an aliphatic polyamide, or a polyamide containing both aliphatic and aromatic units. These long chain polymeric amides are capable of being formed into filaments and having recurring amide groups as an integral part of the main polymer chain. The polyamide ingredient can be a homopolymer, block or random copolymer, or a mixture of two or more of such polymers. The polyamide will usually have both crystalline and amorphous regions. Groups other than amide, respectively, can be present in minor amounts in these polymers, such groups including carbonate, urea, urethane, ether, ketone, imidazole, oxazole and other oxygen-containing groups.

In general, these high molecular weight polyamides are obtained by reacting polyamines, such as the alpha, omegadiamines, like 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides can also be prepared by polymerization of aminocarboxylic acids, such as aminocaproic acid. Polyamides from caprolactam and p-aminobenzoic acid also can be used.

The high molecular weight aromatic or substantially aromatic polyamides are preferred and are obtained by condensation of metaphenylene diamines with isophthalic acid or paraphenylene diamines with terephthalic acids or m-, p-, or o-benzamides or mixtures of such isomeric amines with such isomeric acids. It is also possible to make polyamides using the above mentioned isomers with substituents, such as halogen atoms or lower alkyl groups, on the phenyl groups or to use biphenyl acids with diamines or aromatic diamines and/or diacids in which the aromatic nuclei are spaced by:

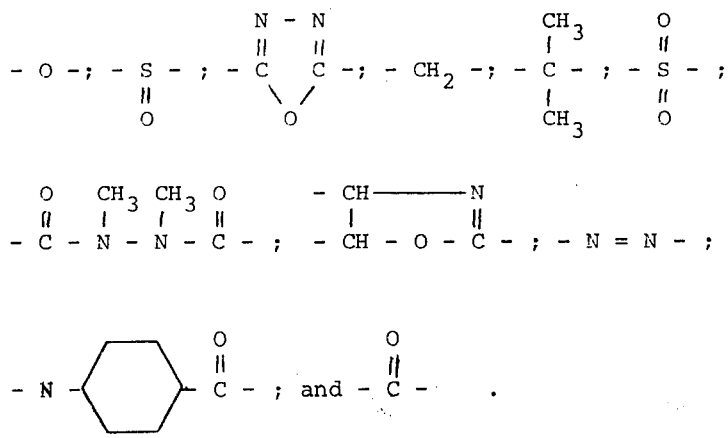

Instead of phenylene groups, the polymers can partly or totally contain heterocyclic rings.

Examples of such materials are polyhexamethylene adipamide, copolymers of metaphenylene diamine and terephthalic or isophthalic acid or acid chloride, poly[bis(4-amino-cyclohexyl)methanedodecamide], poly-para-phenylene terephthalamide from phenylenediamine and terephthaloyl chloride, poly(hexamethylene terephthalamide), poly-m- or p-benzamide and the like. Examples of commercially available aliphatic polyamides are nylon 6 and nylon 66. Examples of commercially available aromatic polyamides are "Nomex" and "Fiber B" (the "aromids" or "aramids").

More preferred are the linear or long chain synthetic aromatic polyamides which are highly crystalline, which have modulus (grams/denier) of at least about 350 and in which at least 85 percent of the amide linkages are attached directly to aromatic rings.

Polyamides and methods for making them are well known as shown by U.S. Pat. Nos. 2,071,250; 2,071,253; 2,130,948; 2,241,321; 3,006,899; 3,094,511; 3,255,011; 3,232,910; 3,308,077; 3,464,878; 3,536,651; 3,629,053; 3,632,548; 3,660,361; and 3,673,143; Belgian Pat. No. 726,050; French Pat. No. 1,526,745; British Pat. No. 1,259,788; "Mechanics of Pneumatic Tires," Clark, National Bureau of Standards Monograph 122, U.S. Department of Commerce, November, 1971, pages 225 to 238; and "Rubber World," April, 1972, page 56. More information on polyamides, especially those for use in making fibers, can be found in "Encyclopedia of Polymer Science and Technology," Interscience Publishers, a division of John Wiley and Sons, Inc., New York, 1969, Volume 10, pages 347 to 460 and, more particularity with respect to high modulus fibers, in "Chem Tech," Preston, November, 1971, pages 664 to 671; "American Chem. Soc. Polym. Prepr.," Bach et al, 11(1), 334 (1970); "Journal of Polymer Science," Frazer et al, Part A, Volume 2, pages 1147 to 1169 (1964); and the "Federal Register," Volume 37, No. 120, June 21, 1972, pages 12243 and 12244.

The polyamide elements are wetted, preferably by dipping or similar saturating technique, with an aqueous solution or dispersion or an organic solution or dispersion of from about 0.3 to 10 percent by weight solids of an epoxide having an average of from about 2 to 4 epoxide groups per molecule. The amount of the polyepoxide can be adjusted within these limits to obtain the desired viscosity of the dispersion or solution as well as the amount of polyepoxide to obtain the desired final pickup (after drying) of polyepoxide solids on the polyamide elements and consequently the desired adhesion. The amount of solids of polyepoxide deposited on the elements can vary from about 0.01 up to about 3 percent by weight, preferably no more than 1.5 percent.

Examples of suitable epoxides are triglycidyl isocyanurate; 1-epoxyethyl-3,4-epoxycyclohexane,; vinyl cyclohexene dioxide; ethylene glycol diglycidic ether; 1,2-propanediol diglycidic ether; 1,3-propanediol diglycidic ether; 1,3-butanediol diglycidic ether; 1,4-butanediol diglycidic ether; 2,3-butanediol diglycidic ether; and the glycidyl ethers of glycerol, erythritol, pentaerythritol, and sorbitol which contain two or three glycidic groups per molecule as in, for example, the diglycidyl ether of gylcerol, the triglycidyl ether of hexanetriol and so forth. Still other polyepoxides can be used such as 3,4-epoxycyclohexyl methyl-3,4-epoxycyclohexane carboxylate; 3-(3,4-epoxycyclohexane)-8,9-epoxy-2,4-dioxaspiro[5.5]-undecane; bis(2,3-epoxycyclopentyl)ether; bis(3,4-epoxy-6-methylcyclohexyl methyl) adipate; the diglycidyl ether of polyethylene glycol 400; polyallyl glycidyl ether; the diglycidyl ether of bisphenol A; epoxy resorcinol ethers, and the like. Mixtures of these polyepoxides can be used. These polyepoxides have a molecular weight of up to about 600. Preferred are the water-soluble polyglycidyl ethers including the polyhydroxylated saturated aliphatic hydrocarbons of from 2 to 10 carbon atoms, especially those hydrocarbons having from 2 to 3 hydroxyl groups. These materials are generally well known and can be made by methods disclosed in the prior art as shown by:

a. "Encyclopedia of Chemical Technology," 2nd Ed., Kirk-Othmer, Volume 8, Interscience Publishers, a division of John Wiley & Sons, Inc., New York, 1965, pages 238 to 312;

b. "Encyclopedia of Polymer Science and Technology," First Edition, Volume 6, Interscience Publishers, a division of John Wiley & Sons, Inc., New York, 1967, pages 83 to 102, 106, 108, 146 to 148, 168 to 170 and 209 to 222 c. "Cyclic Monomers," Frisch, Wiley-Interscience, a division of John Wiley & Sons, Inc., New York, 1972, pages 1 to 54;

d. "Polyethers," Part I Polyalkylene Oxides and Other Polyethers, Gaylord, Interscience Publishers, a division of John Wiley & Sons, Inc., New York, 1963, pages 83 to 102; and e. "Epoxy Resins," Lee and Neville, McGraw-Hill Book Company, Inc., New York, 1957.

Catalysts can be added to the first dip to promote self-polymerization of the polyepoxide, for example, to permit the epoxy molecules to co-react with one another without the catalysts acting as direct crosslinking agents or chain extenders, or without entering into the polyepoxide crosslinked molecule. The catalysts are preferably soluble in water or organic solvents. Unlike hardeners or crosslinking agents which are used in stoichiometric ratios, the catalysts are used in concentrations which may be varied in certain ranges depending on the amount of polyepoxide used and the heat treating times and temperatures. Usually they are employed in a minor amount by weight as compared to the amount by weight of the polyepoxide used. In general, it has been found that the use of catalysts in the epoxide wetting solution or dispersion of this invention can materially reduce the time of the heat treatment of the element following the wetting step. Examples of suitable water soluble catalysts are quaternary ammonium hydroxides and tertiary amines such as tetramethyl ammonium hydroxide, tetraethyl ammonium hydroxide, triethylamine, trimethyl, amine, tributyl amine, tripropyl amine, butyl dimethyl amine, dimethyl iso-butyl amine, and the like and mixtures thereof.

The solvent or dispersant for the epoxide should not adversely affect the polyamide elements. Examples include water, methanol, ethanol, propanol, benzene, toluene and the like and miscible mixtures thereof. Other organic solvents for epoxides are well known. Emulsifying agents, especially nonionic emulsifying agents, can be used to make aqueous or organic dispersions. It is much preferred to use aqueous solutions of the epoxides.

In order to apply the epoxide to the polyamide elements in a thorough reliable manner, the elements are preferably fed through a dip bath while being maintained under a small predetermined tension, then into a drying oven where they are stretched (about 2 percent to prevent sagging) and dried under such predetermined tension, and then into a cooling zone where they are air cooled before the tension is released. In each case the epoxide-coated elements leaving the dip are dried in ovens at from about 300° to 500°F., or at a temperature below the decomposition point of the element, for from about 30-150 seconds while being stretched 2 percent to heat set the epoxide on and in the elements. The time the elements remain in the dip is about a second or so or at least for a period of time sufficient to allow penetration and wetting of the elements. The epoxide coated elements have the same general appearance and feel as corresponding untreated elements.

The type of polyester resin to be used with the polyamide elements is any unsaturated liquid uncured polyester resin. Polyester resins generally are made by esterifying (condensing) one or more unsaturated polycarboxylic acids or a mixture of an unsaturated and a saturated carboxylic acid with one or more glycols and removing water to form a viscous liquid or meltable solid. The unbroken double bonds, carried over from the acid into the resin, can be later opened up by a free radical-generating catalyst for further polymerization or cross-linking. Examples of unsaturated polycarboxylic acids suitable to prepare polyester resins include dicarboxylic acids such as fumaric and maleic while the saturated acid, if used, can be oxalic; malonic; succinic; glutaric; adipic; pimelic; suberic; sebacic; the phthalic acids such as phthalic, isophthalic, terephthalic, hexahydroterephthalic, tetrachlorophthalic, chlorophthalic, and nitrophthalic and the phthalic anhydrides; and diphenic acid and tricarboxylic acids such as tricarballylic acid and citric acid. The mol ratio of saturated to unsaturated acids in the preparation of the unsaturated polyester is no greater than 4:1, preferably from 0 to 2:1. Examples of suitable glycols include ethylene glycol; propylene glycol; ethylene glycol carbonate; butane-2,3-diol; trimethylene glycol; butane-1,3-diol; 2-methyl propane-1,3-diol; 2,2-dimethyl propane-1,3-diol; 2,2-diethyl propane-1,3-diol; cis-but-2-ene-1,4-diol; trans-but-2-ene-1,4-diol; tetramethylene glycol; pentamethylene glycol; hexamethylene glycol; heptamethylene glycol; octamethylene glycol; diethylene glycol; triethylene glycol; and tetraethylene glycol.

The method of this invention is useful for preparing polyamide reinforced polyesters which can be molded, for example, as automobile parts. The flexible polyamide permits working the uncured resin as opposed to fiberglass reinforcement which breaks down as the resin is worked.

The following examples illustrate the presently best-known mode of practicing this invention and are not intended to limit this invention. Unless otherwise stated all quantitative measurements are by weight.

EXAMPLE I

The polyamide elements employed in this example were in the form of substantially untwisted 1500 denier yarn from a 3-yarn cord sold commercially as du Pont Fiber B, a long chain synthetic aromatic polyamide (polyparaphenyleneterephthalamide) in which at least 85 percent of the amide linkages are attached directly to aromatic rings, which is highly crystalline, which has a breaking strength of 180 lbs., a tenacity of 18 grams/denier, an elongation of break of 4 percent, a modulus of 350 grams/denier, a loop tenacity of 8.0 grams/denier, a growth and creep of 0.49 percent (lgpd, 30 minutes, 75°F.), and a 160°C. shrinkage of 0 percent. The epoxide dip was a 2 percent solution in water of a commerical water-soluble epoxide (NER-010A-Nagase & Co. Ltd.) which is a condensation product of epichlorohydrin and glycerol, said product having an epoxy equivalent weight of 153, a viscosity at 25°C. of 110 cps. and specific gravity of about 1.23. The polyester resin was a commercial medium-to-highly reactive liquid unsaturated polyester (PPG Selectron 50204) containing approximately 30 percent styrene.

A yarn specimen was dipped in the 2 percent aqueous epoxide solution and then dried and cured in air at 450°F. for 60 seconds. The treated yarn was then immersed in the polyester resin to which had been added 1 percent of a 60 percent solution of methyl ethyl ketone peroxide in a plasticizer. Excess resin was removed by pulling the yarn through a small metal orifice after which the yarn was wound around a 500 ml. polyethylene conical beaker in 75 turns, the yarn bundle was stripped off the beaker and laid up double and pulled into a ¼ inch internal diameter plastic tube. The resin was cured by heating the composite at 100°C. for one hour after which the plastic tubing was cut open and removed. Two ½ inch lengths were cut from the resulting composite rod with a band saw and tested in compression in a direction perpendicular to the fibers. The specimens failed under compression at weights of 964 lbs. and 1135 lbs.

For comparison, this work was repeated without the epoxide dip, and the resulting composite specimens failed under compression at 325 lbs. and 326 lbs.

Similar excellent comparative results are achieved when the following epoxide dips are employed in place of the 2 percent aqueous solution described above:

a. a 1 percent aqueous solution of the above described commercial epoxide.
b. a 1 percent aqueous solution of butanediol diglycidyl ether.
c. a 1 percent aqueous solution of a commercial water-soluble epoxide derivative of glycerol having an epoxide equivalent of 150 to 170 and a viscosity of 120 to 200 cps.
d. a 1 percent aqueous solution of vinyl cyclohexene dioxide.
e. a 1 percent aqueous solution of a commercial water-soluble epoxide derivative of glycerol having an epoxide equivalent of 143 to 180 and a viscosity of 250 to 500 cps.
f. a 1 percent aqueous solution of polyallyl glycidyl ether having a molecular weight of about 520 and an average of about 3.5 epoxy groups per molecule.
g. a 1 percent aqueous solution of diglycidyl glycerol.
h. a 2½ percent aqueous emulsion of a 10:1 mixture of a commercial water-soluble diglycidyl ether of bisphenol A having an epoxide equivalent of about 185 to 192 and a molecular weight of about 350 to 400 and a commercial non-ionic polyoxyethylene sorbitan monopalmitate emulsifier.
i. a 2½ percent aqueous emulsion of a 20:1 mixture of a commercial water-insoluble epoxy resorcinol ether resin having an epoxide equivalent of about 127 and a viscosity at 25°C. of 300 to 500 and the commercial emulsifier of (h).
j. a solution in 100 grams of 2B ethanol (The Merck Index, 7th Ed.) of one gram of the commerical epoxide of (h).

Similar excellent comparative results are also achieved when other commerical liquid unsaturated polyester resins as previously used herein.

EXMAPLE II

The polyamide elements employed in this example were the same as those employed in Example I except they were ½ inch long. The epoxide dip was the 1 percent aqueous solution of Example I (a). The polyester resin was a commercial low shrink liquid bulk molding compound (Rohm & Haas Paraplex P-19C) comprising 25 parts of a 60:40 mixture of an unsaturated, highly reactive polyester resin dissolved in styrene monomer and an acrylic polymer-styrene monomer syrup, 55 parts of a calcium carbonate filler, 0.75 magnesium hydroxide thickening agent, one part of zinc stearate lubricant and 0.25 part of t-butyl perbenzoate catalyst.

Some of the polyamide elements were dipped in the 1 percent aqueous epoxide solution and then dried and cured at 450°F. for 90 seconds. Three blends with equal volume loading, were mixed separately on a small Baker-Perkins mixer, the first blend being the commercial bulk molding compound (BMC) plus 20 percent based on the weight of BMC of a commercial ½ inch long fiberglass (OCF No. 832); the second blend being the BMC plus 13.2 percent based on the weight of BMC of the epoxide-treated polyamide elements; and the third blend being the same as the second blend except that the polyamide elements were not epoxide-treated.

Samples of the three blends were identically compression molded at 1000 psig. and 300°F. for 3 minutes and tested for flexural strength. The three blends had respective flexural strengths of 12,800 psi, 11,300 psi. and 8700 psi. Thus, the pretreatment of the polyamide elements not only improves the flexural strength of a resulting polyester composite by about 30% but improves the flexural strength almost to the level provided by fiberglass reinforcement.

What is claimed:

1. A method for preparing a polyester resin article reinforced with polyamide elements which comprises wetting said elements with a liquid consisting essentially of a dispersion or suspension of a minor amount of an epoxide having an average of from about 2 to 4 epoxide groups per molecule and having a molecular weight up to about 600, heat curing said wetted elements to produce dried polyepoxide treated elements, introducing said dried polyepoxide treated elements into an uncured liquid unsaturated polyester resin, shaping the resulting composite as desired and curing it.

2. The product produced by the method of claim 1.

3. The product according to claim 2 in which said polyamide reinforcing element is a cord of linear long chain synthetic aromatic poly(para phenylene terephthalamide) in which at least 85 percent of the amide linkages are attached directly to aromatic rings; which is highly crystalline, and which has a modulus (grams/denier) of at least about 350.

4. A method for adhering polyamide reinforcing elements to polyester resin which comprises wetting said elements with a composition consisting essentially of an aqueous solution containing from about 0.3 to 10 percent by weight as dissolved solids of water soluble polyepoxide having an average of from about 2 to 4 epoxide groups per molecule and a molecular weight up to about 600, heat treating under slight tension said elements containing said solution to remove the water, to deposit on said elements from about 0.01 to 1.5 percent by weight of said polyepoxide based on the weight of said elements, and to heat set said polyepoxide on said elements, thereby producing polyepoxide treated elements, cooling said polyepoxide treated elements, combining said cooled treated elements with a liquid uncured unsaturated polyester resin, shaping the resulting composite and curing it.

5. A method according to claim 2 where said polyamide reinforcing element is a linear long chain synthetic aromatic poly(para phenylene terephthalamide) in which at least 85 percent of the amide linkages are attached directly to aromatic rings, which is highly crystalline, and which has a modulus (grams/denier) of at least about 350.

6. A method according to claim 2 where said composition contains additionally a water-soluble catalyst for said polyepoxide, which does not cross link nor chain extend with said polyepoxide, and which is selected from the group consisting of quaternary ammonium hydroxides and tertiary amines.

7. The method of claim 4 wherein the liquid uncured unsaturated polyester resin comprises a copolymerizable monomer.

8. The method of claim 7 wherein said monomer is styrene.

* * * * *

UNITED STATES PATENT OFFICE
CERTIFICATE OF CORRECTION

PATENT NO. : 3,878,035
DATED : April 15, 1975
INVENTOR(S) : Gerard E. Van Gils

It is certified that error appears in the above-identified patent and that said Letters Patent are hereby corrected as shown below:

Claim 5, line 1: change "claim 2" to ---claim 4---.

Claim 6, line 1: change "claim 2" to ---claim 4---.

Signed and Sealed this twenty-ninth Day of July 1975

[SEAL]

Attest:

RUTH C. MASON
Attesting Officer

C. MARSHALL DANN
Commissioner of Patents and Trademarks